United States Patent [19] [11] 4,396,839
Playfoot et al. [45] Aug. 2, 1983

[54] METHOD OF FABRICATING A SELF-POWERED RADIATION DETECTOR

[75] Inventors: Kerwin C. Playfoot, Horseheads; Youston M. Sekella, Elmira Heights; Richard F. Bauer, Horseheads, all of N.Y.

[73] Assignee: Westinghouse Electric Corp., Pittsburgh, Pa.

[21] Appl. No.: 249,523

[22] Filed: Mar. 31, 1981

[51] Int. Cl.³ .............................................. G01T 3/00
[52] U.S. Cl. .................................... 250/370; 250/390
[58] Field of Search ............... 250/390, 391, 392, 370; 376/153

[56] References Cited

U.S. PATENT DOCUMENTS

| | | | |
|---|---|---|---|
| 3,787,697 | 1/1974 | Shields | 250/390 X |
| 4,080,533 | 3/1978 | Todt et al. | 250/390 X |
| 4,087,693 | 5/1978 | Brown et al. | 250/390 |
| 4,140,911 | 2/1979 | Todt et al. | 250/390 |
| 4,267,454 | 5/1981 | Playfoot et al. | 250/390 X |

Primary Examiner—Davis L. Willis
Attorney, Agent, or Firm—W. G. Sutcliff

[57] ABSTRACT

A method of fabricating a self-powered nuclear radiation detector assembly comprising a detector portion of accurately predetermined dimensions and a cable portion connected to the detector portion to carry the signal current which is generated in a radiation flux field to remote monitoring means. The detector portion consists of a radiation responsive elongated central emitter electrode which is insulated from a generally tubular sheath collector electrode. The emitter electrode and the signal cable center wire are electrically connected at one end and disposed within the collector electrode tubular sheath with compressible insulating means disposed between the wires and the tubular sheath. The above assembly is reduced in diameter while elongating the tubular sheath and the emitter wire and signal cable wire. The emitter wire is reduced to a predetermined desired diameter, and is trimmed to a predetermined length. An end cap is hermetically sealed to the tubular sheath at the extending end of the emitter with insulating means between the emitter end and the end cap.

3 Claims, 3 Drawing Figures

METHOD OF FABRICATING A SELF-POWERED RADIATION DETECTOR

BACKGROUND OF THE INVENTION

The present invention relates to nuclear radiation detectors, and more particularly to self-powered detectors and their method of manufacture.

A self-powered nuclear radiation detector is one in which no drive potential need be applied to the detector to produce a signal as a function of the neutron or gamma radiation flux incident on the detector. The output signal from a self-powered detector is produced as a result of the differing radiation interaction characteristics of the spaced apart, insulated emitter and collector electrodes. Such a detector is taught in U.S. Pat. No. 4,080,533, and includes a centralized emitter electrode and a coaxial collector electrode about the emitter and insulated therefrom by a refractory insulating oxide.

The accuracy of the output signal as a measure of the radiation flux level is highly dependent upon the emitter diameter and length, with the emitter diameter desired to be uniform along its length and the length to be accurately determined. A detector is remotely positioned from the signal indicator or meter which is typically outside the radiation flux field. A signal cable must be connected to the detector. The signal cable is typically a cable with the center wire aligned with and electrically connected to the detector emitter.

It has been the practice to fabricate the detector to close dimensional tolerances separately, and to then join this detector of desired length to the signal cable as by brazing together the emitter and cable center wire, and brazing the outer sheaths. The junction between the detector and the signal cable has been difficult to make reliably, due to the small diameters of the fabricated devices. The junction was easily broken during testing and handling, or during insertion of the detector into the reactor.

Another fabrication technique practiced in the prior art had been to join the emitter wire and signal cable center wire before reducing the diameters of the emitter and the cable center wire to their desired values. The joined emitter wire and cable center wire were then placed within a continuous tubular sheath with insulation compacted about the emitter and center wire, and thereafter the entire assembly swage-reduced to a desired diameter. This technique tended to compromise on either the final emitter wire diameter or length with resulting variations in detector sensitivity.

It is important to produce detector and cable assemblies which has accurate, reproducible sensitivities. This is because the signal levels being generated are typically very small, in the nanoamp range. Also, the detectors have a finite operating life due to changes in emitter radiation response over time. This means that the detector and cable assemblies will be periodically replaced, and without repeatable radiation response from assembly to assembly it is difficult to interpret the reactor operation conditions.

It is an object of the present invention to be able to fabricate a detector and signal cable assembly in which the detector emitter diameter and length are very accurately determined, to permit good quality control of the fabricated assemblies radiation sensitivity.

It is also an object to produce detector and signal cable assemblies with a strong reliable junction between the emitter wire of the detector and the signal cable center wire.

In U.S. Pat. No. 4,087,693, a self-powered detector is fabricated by welding together the ends of a rhodium emitter wire and a signal cable wire. An insulating sheath of woven silicon dioxide fiber is placed over the joined emitter and signal cable wire. A tubular, collector electrode is then placed over the insulating sheath and is slightly reduced in size to compact the insulating fiber sheath and center the emitter wire. There is no significant change in the emitter wire diameter. An end plug is then provided at the extending end of the emitter, with insulation between the emitter end and the plug.

It is desirable to be able to fabricate long emitter wire detectors, which are more practically made by starting with a larger diameter emitter and swage reducing the emitter wire during fabrication. This swage reducing or uniform elongation with reduction in diameter is a convenient way of providing uniform diameter elongated detectors.

SUMMARY OF THE INVENTION

An accurately reproducible self-powered nuclear radiation detector assembly is fabricated by electrically connecting opposed ends of an emitter wire and signal cable center wire, disposing the joined emitter wire and signal cable center wire with a tubular sheath with insulating means therebetween, and swage-reducing the assembly to reduce the emitter wire to a predetermined diameter. The emitter wire length is then accurately determined and trimmed to the desired length. A hermetic end seal is made at the trimmed free end of the emitter with insulating means between the emitter wire and the end seal.

The self-powered radiation detector assemblies of the present invention are typically elongated devices with the active detector extending from several feet to tens of feet long, with the signal cable being much longer. A plurality of detector and cable assemblies may be formed into an assembly such as shown in U.S. Pat. No. 4,140,911 for use in a reactor. The active detector portions may be helically wound about a support member to provide an elongated emitter wire in a given flux area to provide an increased response signal level.

DESCRIPTION OF THE PREFERRED EMBODIMENTS

Figure 1:
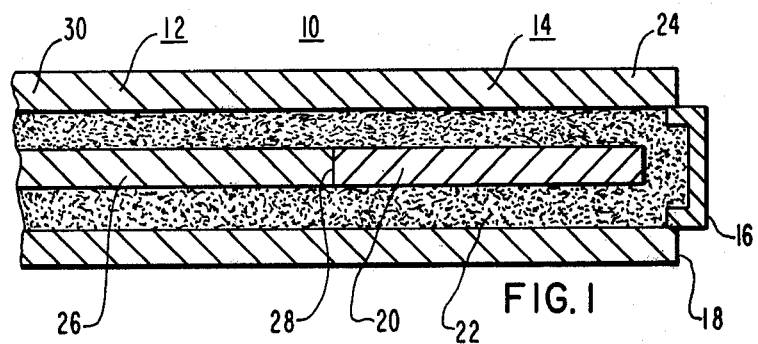
FIG. 1 is an elevation view in section of a self-powered radiation detector assembly of the present invention including a signal cable continuation from the detector portion.

The invention can be best understood by reference to the drawings. In FIG. 1, a self-powered nuclear radiation detector assembly 10 comprises a coaxial signal cable portion 12, and a radiation responsive detector portion 14. A hermetic end seal means 16 is provided at the extending end 18 of the detector portion 14. The radiation responsive detector portion 14 comprises an elongated emitter electrode 20 of a predetermined diameter and length. This emitter electrode 20 is formed of a radiation responsive material which can be neutron or gamma responsive such as cobalt, rhodium, platinum, or other materials well known in the art. Highly compacted insulating means 22 is disposed about the emitter 20, which insulating means is typically selected metal oxide such as powdered magnesium oxide. An elongated generally tubular collector electrode 24 is disposed coaxially about the emitter 20 and insulating means 22. This collector electrode 24 is formed of a material which is relatively non-radiation responsive, and the detector signal current which is produced between the emitter and collector results from the differing radiation responses of these distinct materials. The signal current flows across the insulating means 22. The end seal means 16 is sealed to the terminal end of the tubular collector 24 as will be explained hereafter.

The radiation responsive signal current generated in the detector portion 14 disposed in the radiation flux field is fed to remote external monitoring means not shown, by the signal cable portion 12. The signal cable portion 12 is essentially a coaxial cable with a signal cable center wire 26 which is electrically connected to the emitter electrode at junction 28. Insulation means 22 is provided about the center wire 26, and is the same metal oxide as provided about the emitter wire. A tubular coaxial cable sheath 30 is provided about the insulating means 22 and cable center wire 26. This cable sheath 30 is generally an extension of the collector electrode 24, and is typically formed of a high nickel content steel such as Inconel steel, which is a trademarked material of the International Nickel Co.

Figure 2:
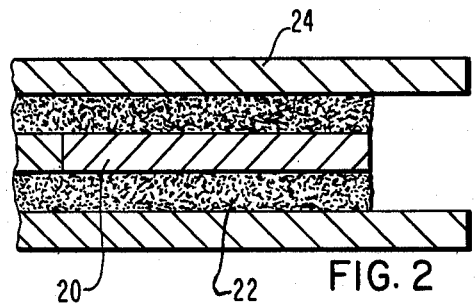
FIG. 2 is a sectional representation of a partially fabricated detector assembly which illustrates a stage of fabrication.

The present invention which is the method of fabrication of the detector assembly 10 seen in FIG. 1, can be understood by reference to FIGS. 1 and 2. The fabrication process starts with an emitter wire which is of a relatively larger diameter which is swagable down to the desired final diameter and the approximate desired length. This emitter wire is electrically connected at junction 28 as by brazing or welding to the signal cable center wire which is also swagable down to the desired final diameter. The joined emitter wire and cable center wire are disposed with a tubular conductor with insulation means compacted between these centralized wires and the tubular conductor. The preform assembly is then swag-reduced to elongate the assembly and reduce the diameter of the emitter and cable center wire and to reduce the outer conductive tubular sheath. During this swagging process, the insulator means is likewise further compacted.

When the emitter wire has been uniformly reduced to the desired diameter of for example from about 0.040 to 0.080 inch, the emitter is trimmed to the desired length as shown in FIG. 2. The collector electrode extending beyond the trimmed predetermined end of the emitter. Sufficient insulation means is compacted about the emitter end and an end seal cap, as seen in FIG. 1, is hermetically sealed to the terminal end of the tubular collector.

Figure 3:
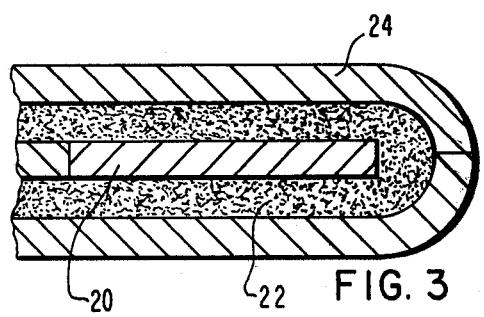
FIG. 3 is an elevation view in section of the detector end portion of another embodiment of the present invention.

An alternative end seal is seen in FIG. 3, where the extending ends of the tubular collector are simply compressed while being heated to form a bulbous end seal with or without braze material. Again insulation means is compacted between the emitter end and the bulbous end seal formed by the compressed collector end portion.

The detector of the present invention can be fabricated other than by swage reduction of the preassembled collector sheath, insulation, and emitter wire. This reduction to a predetermined diameter and length can be made by drawing the preassembly through a drawing die, or by a combination of swaging and drawing to achieve the desired diameter and length. The assembly is then cut to length and an end seal or cap completes the detector assembly.

We claim:

1. Method of fabricating a self-powered nuclear radiation detector assembly which comprises a detector portion which generates a signal current as a function of incident radiation flux, and a cable portion electrically connected to the detector portion to carry the signal current to monitoring means; which method comprises;
   (a) electrically connecting opposed ends of an emitter electrode wire and a signal cable wire, which wires are swage-reducible to a predetermined reduced diameter and length;
   (b) disposing the electrically connected emitter electrode wire and the signal cable wire within a generally tubular sheath of swage-reducible metal, with selected insulating means disposed between the wires and the tubular sheath;
   (c) reducing the above assembly diameter and elongating the tubular sheath and emitter wire and signal cable wire while compacting the insulating means;
   (d) trimming the emitter wire to a predetermined length; and
   (e) hermetically sealing the tubular sheath at the emitter electrode end thereof with insulating means between the emitter wire and the end seal.

2. The method specified in claim 1, wherein the reduction of the preassembled tubular sheath, insulation means, and emitter wire is carried out by swaging.

3. The method specified in claim 1, wherein the heremetic seal of the tubular sheath is made by an end cap sealed to the end of the tubular sheath.

* * * * *